Jan. 8, 1957     N. H. HACKETT     2,776,734
HYDRAULIC BRAKE SYSTEM
Filed Jan. 24, 1952     3 Sheets-Sheet 1
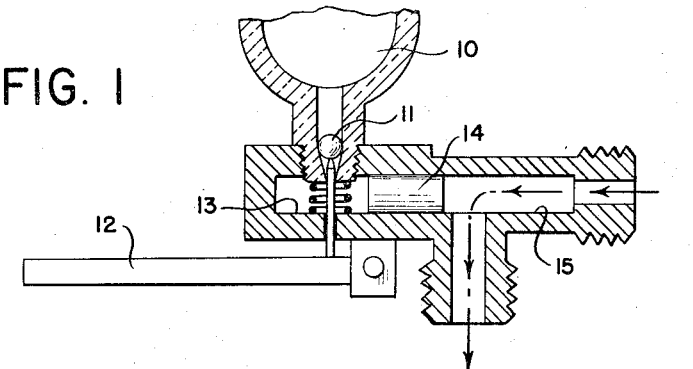
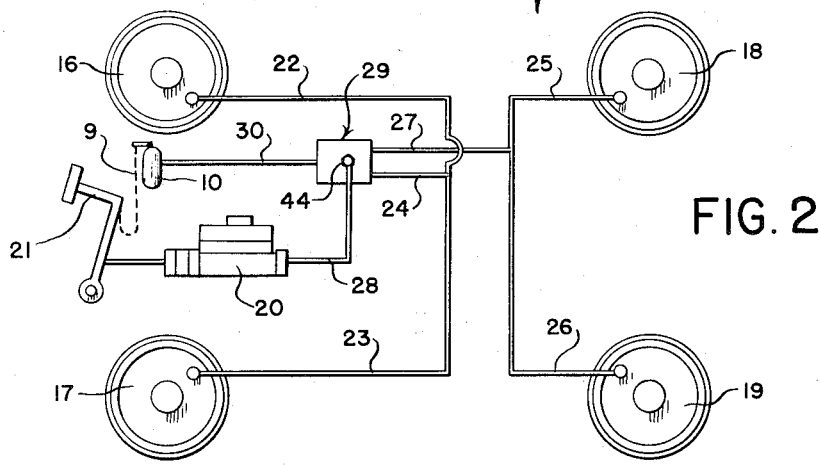
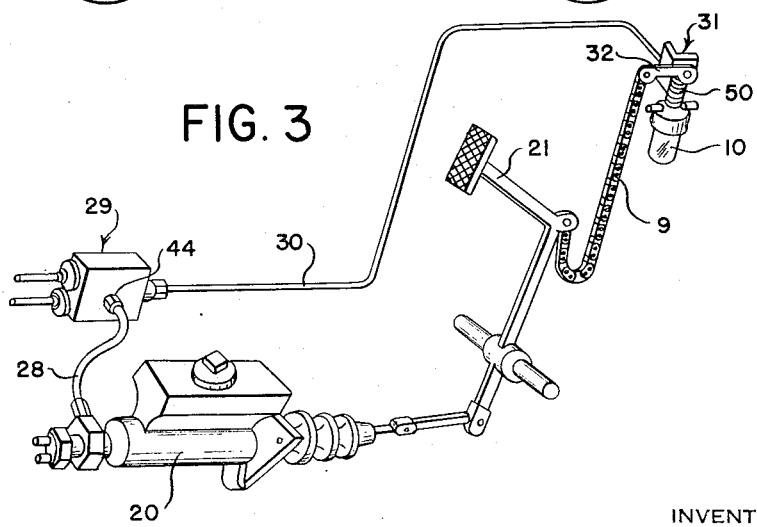
INVENTOR
Norman Henry Hackett INVENTOR
Norman Henry Hackett
BY
ATTORNEY

United States Patent Office 2,776,734
Patented Jan. 8, 1957

2,776,734

HYDRAULIC BRAKE SYSTEM

Norman Henry Hackett, Bondi, near Sydney, Australia

Application January 24, 1952, Serial No. 267,991

4 Claims. (Cl. 188—152)

This invention relates to a safety device adapted to be fitted to a motor vehicle for use with the hydraulic brake system thereof.

An object of the present invention is to provide a safety device of the above nature which in the event of failure of the existing hydraulic equipment will function to apply the brakes.

According to the present invention means are provided whereby on the failure of a portion of the normal hydraulic equipment pressure fluid from a container is fed to that portion of the hydraulic brake system which is unaffected by the said failure.

In the normal hydraulic brake system there is a master cylinder the function of which is to pump brake fluid to the respective wheels by means of suitable pipe lines one of such lines being provided for the brake cylinder of each wheel, the pipe lines to the back wheels and those to the front wheels being connected in pairs to respective pipes which lead from a junction chamber fed by the master cylinder.

According to the present invention the pressure fluid from the container is fed by a valve to the pipe lines should the master cylinder fail, the said valve being opened by a lever which is engaged by the brake pedal when the latter due to non-resistance by the master cylinder reaches a position near the floor board which is lower than the position reached by the brake pedal under normal operation thereof.

In order that the invention may be more readily understood reference will now be made to the accompanying drawings wherein:

Figure 1 is a detail view illustrating the invention in its simplest form.

Figure 2 illustrates diagrammatically a normal hydraulic braking system to which the present invention has been fitted.

Figure 3 is a detail view on an enlarged scale illustrating a normal master cylinder and brake pedal with which is incorporated the present invention.

Figure 4:
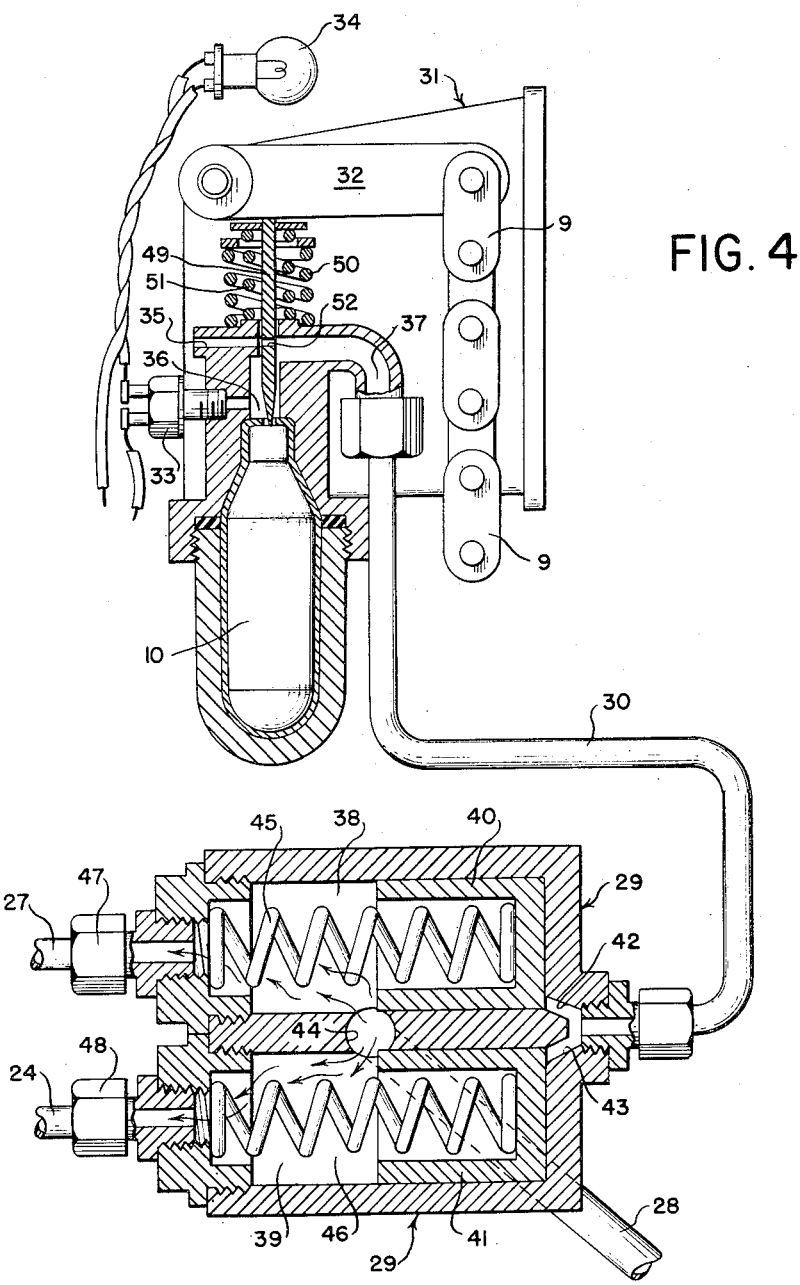
Figure 4 is a detail view on a further enlarged scale illustrating the pressure fluid reservoir and the means whereby the valve thereof is operated from the brake pedal, and also the fluid distributing unit which feeds the respective brake cylinders according to the conditions of the failure of the brakes.

Referring to Figure 1 the compressed gas reservoir 10 has a valve 11 which may be opened by a lever 12 to admit gas to a cylinder 13 and by means of which a piston 14 is moved in the cylinder 13 to close the passage 15 which leads from the master cylinder of a motor vehicle to the respective pipes which normally supply brake fluid to the respective brakes.

As illustrated the piston 14 is in its normal position and the device is inoperative but when the piston 14 is moved as above the master cylinder is cut off from the brakes and the pressure gas may pass from the reservoir 10 to the said brake pipes.

The invention is described in greater detail in Figures 2 to 8 inclusive reference being first made to Figure 2 as it is necessary to understand the kind of hydraulic braking system to which the present invention relates. In this view the front wheels 16, 17 and the rear wheels 18, 19 are normally fed by brake fluid from a master cylinder 20 on application of the brake pedal 21. The front wheels 16 and 17 are fed by pipes 22 and 23 respectively from a common feed pipe 24 and the rear wheels 18 and 19 are fed by pipes 25 and 26 from a common feed pipe 27.

The said common feed pipes 24 and 27 usually lead from a junction fitting which has a pipe 28 connecting it with the master cylinder 20 but as illustrated the junction fitting is replaced by an emergency unit 29 which has a pipe 30 leading from the gas reservoir 10. The above features are more clearly shown in Figure 3 wherein is also shown the gas reservoir 10 and its operating chain 9 connected to the brake pedal 21 which is equivalent to the lever 12 of Figure 1.

In the general assembly see Figures 4, 5, 6, 7 and 8 the reservoir 10 is disposed in a housing 31 secured to the vehicle said housing 31 also having an operating lever 32 pivoted thereto and to which the end of the operating chain 9 remote from the pedal 21 is connected; the housing 31 also has fitted thereto a diaphragm switch 33 of known construction which is included in circuit with a warning lamp 34 provided to indicate that the emergency braking device is in use.

The housing 31 has an atmosphere port 35, a gas discharge chamber 36 and a transfer passage 37 which connects with the emergency unit 29 by means of said pipe 30.

The emergency unit 29 has two cylinders 38 and 39 within which respective pistons 40 and 41 operate under pressure gas from the reservoir 10 said gas being admitted through a single pipe 30 to the ports 42 and 43 of the said cylinders 38 and 39 respectively. The said emergency unit 29 has a central port 44 which opens into the respective cylinders 38 and 39 when uncovered by pistons 40 and 41 respectively as seen in Figure 4, the cylinders 38 and 39 being supplied with brake fluid from the master cylinder 20 through pipe 28 and central port 44 and the respective pistons 40 and 41 being held in their normal position Figure 4 by respective springs 45 and 46. The brake fluid received in the respective cylinders 38 and 39 is fed by pipes 22 and 23 and pipes 25 and 26 respectively to the front and rear wheels by the common pipes 24 and 27 which are connected to nipples 47 and 48 respectively.

In normal operation on depressing the brake pedal 21 brake fluid passes from the master cylinder 20 through pipe 28 to central port 44 and through both cylinders 38, 39 to the respective rear and front wheels by means of pipes 25, 26 and 22, 23 respectively.

Figure 7:
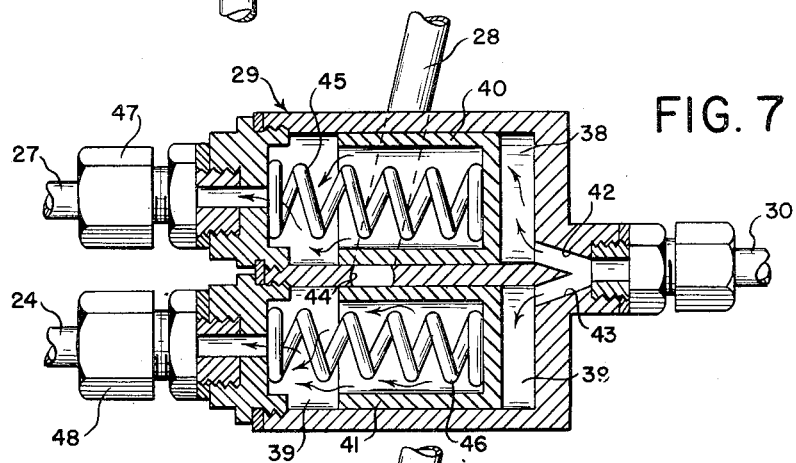
Figure 7 is a detail view illustrating the emergency unit with both pistons partly advanced as would occur when the master cylinder is defective.

If the master cylinder 20 should fail, see Figure 7, the brake pedal 21 will travel a sufficient distance to pull on the chain 9 and depress the lever 32 together with the light valve spring 51, pierce the reservoir 10 by means of needle valve 49, and compress the main spring 50 of lever 32, whereupon pressure gas operates diaphragm switch 33 of indicator lamp 34 showing that the emergency device is in use.

Figure 5:
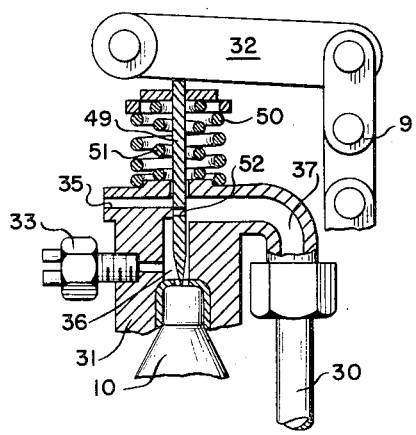
Figure 5 is a detail view showing the position of the piercing valve for the gas reservoir in its initial operated position.
Figure 6:
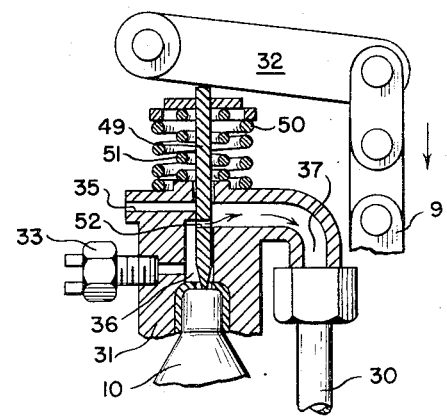
Figure 6 is a detail view corresponding to Figure 5 but with the piercing valve in its fully operated position.

The gas under pressure from reservoir 10 now passes through port 52 in the needle valve 49, see Figures 4, 5 and 6, into transfer passage 37, see arrows in Figure 6, and then passes by pipe 30 to the emergency unit 29 and through ports 42 and 43 to the respective cylinders 38 and 39 with the result that both pistons move to close the central port 44 and thereby isolate the master cylinder 20, whereupon the brake fluid in the opposite end of the respective cylinders 38 and 39 is fed to the respective wheels 16, 17 and 18, 19 by the respective pipes 22, 23 and 25, 26 and thus makes an emergency application of the brakes on said wheels. On removing pressure from the brake pedal 21 the latter lifts by reason of the strong spring 50 and the valve lifts by light spring 51 whereupon port 52 on the needle valve 49 opens passage 37 to atmosphere through port 35 and the springs in the cylinders return the pistons 40, 41 to their normal position ready for another emergency application.

Figure 8:
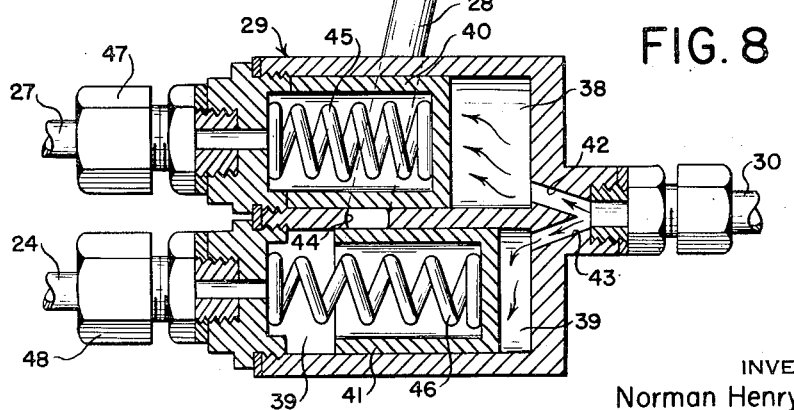
Figure 8 is a detail view corresponding to Figure 7 illustrating the emergency unit with one piston fully advanced and the other partly advanced as would occur if a break has occurred in one of the pipe lines but the master cylinder is not defective.

Should the master cylinder 20 be unaffected, but the pipe 27 to the rear wheels be broken see Figure 8 the master cylinder 20 will not function effectively and pressure gas will pass to the emergency device 29 as before, the piston 40 of cylinder 38 will operate quickly to close pipe 27 and then the other piston 41 will operate to force the brake fluid in its cylinder 39 to the respective front wheel brakes under its control.

I claim:

1. In a motor vehicle having front and rear wheels, a hydraulic braking system comprising a brake cylinder associated with each of said wheels, a master cylinder, a brake pedal for operating said master cylinder, and a pair of emergency cylinders in a single housing, pipes communicating between said master cylinder and said emergency cylinders through a port in said housing opening into both of said emergency cylinders, and also communicating between said emergency cylinders and the brake cylinders of said front and rear wheels respectively, pistons within said emergency cylinders, said pistons under normal braking operation being positioned so as not to interfere with the flow of brake fluid from said master cylinder to said brake cylinders through said port and emergency cylinders, a normally sealed source of gas under pressure, and means responsive to movement of said brake pedal beyond the normal travel thereof in effecting operation of the brakes by the master cylinder for releasing gas under pressure from said source to operate said pistons, said gas moving said pistons to cover said port and to force fluid from said emergency cylinders through said pipes to said brake cylinders.

2. A hydraulic braking system as claimed in claim 1 including means for automatically returning said pistons to normal non-interfering position upon release of said brake pedal.

3. A hydraulic braking system as claimed in claim 1 including a vent for reducing the gas pressure to atmospheric pressure, said vent being operative when said brake pedal is released, and spring means for returning said pistons to normal non-interfering position when the pressure is so reduced.

4. A hydraulic braking system as claimed in claim 1 including means for automatically resealing said source of gas upon release of said brake pedal.

References Cited in the file of this patent

UNITED STATES PATENTS

| 1,444,984 | Simmon | Feb. 13, 1923 |
| 2,067,697 | Fontaine | Jan. 12, 1937 |
| 2,092,364 | Stevens | Sept. 7, 1937 |
| 2,203,908 | Hess | June 11, 1940 |
| 2,254,890 | Gardiner | Sept. 2, 1941 |
| 2,332,301 | Cox | Oct. 19, 1943 |
| 2,365,557 | Keith | Dec. 19, 1944 |
| 2,394,343 | Vorech | Feb. 5, 1946 |
| 2,493,196 | Hollerith | Jan. 3, 1950 |
| 2,539,538 | Hayes | Jan. 30, 1951 |

FOREIGN PATENTS

| 629,247 | Great Britain | Sept. 15, 1949 |